March 10, 1953     D. H. BALLANTYNE     2,630,675
FUEL AND STARTING SYSTEM FOR GAS TURBINE ENGINES
Filed June 29, 1948
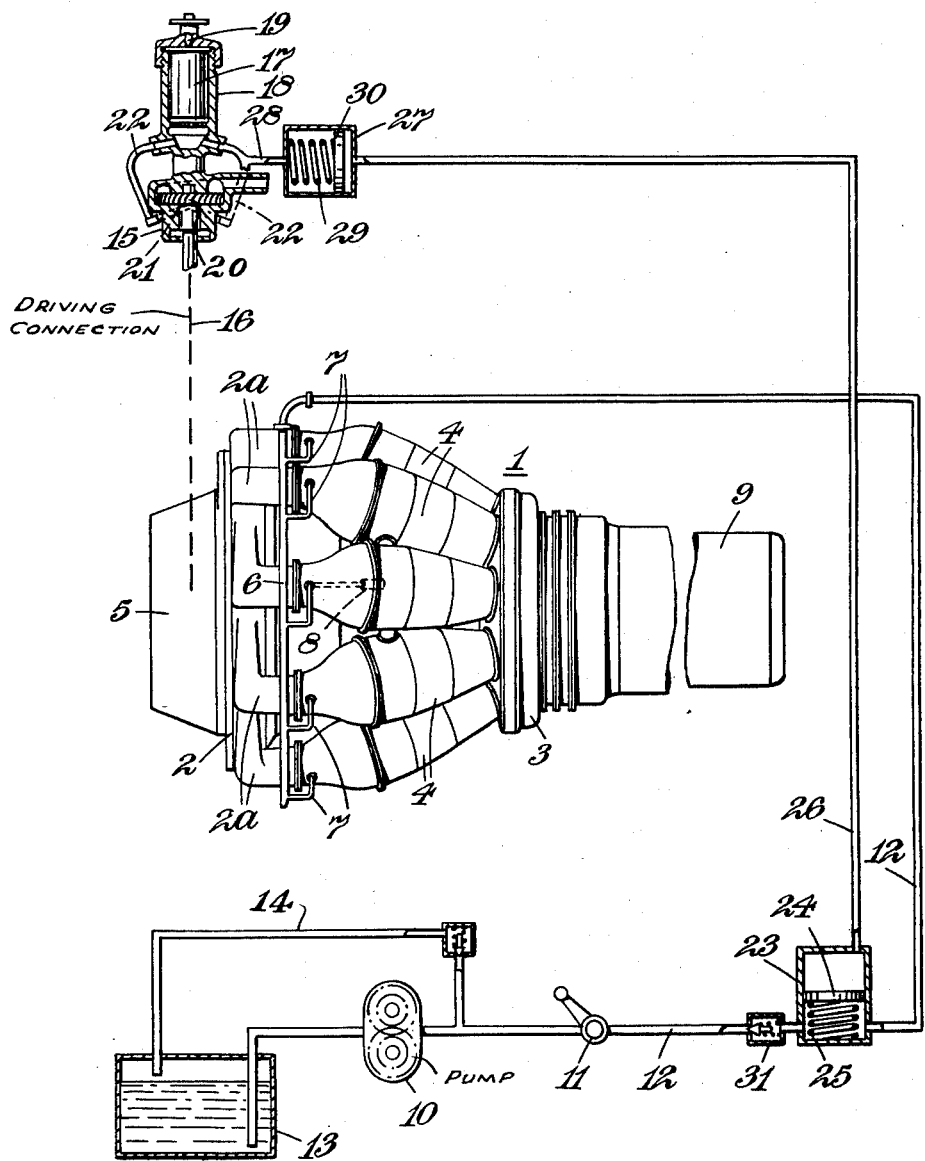
INVENTOR
DAVID H. BALLANTYNE Patented Mar. 10, 1953

2,630,675

UNITED STATES PATENT OFFICE 2,630,675

FUEL AND STARTING SYSTEM FOR GAS-TURBINE ENGINES

David Havelock Ballantyne, Littleover, England, assignor to Rolls-Royce Limited, Derby, England, a British company Application June 29, 1948, Serial No. 35,810
In Great Britain July 4, 1947

11 Claims. (Cl. 60—39.14)

This invention relates to fuel- and starting-systems for gas-turbine-engines. Such engines normally comprise a turbine-system driving a compressor-system, and the starting process usually involves the rotation of the mechanically coupled compressor-turbine system by means of an external power source, during which rotation fuel is injected into combustion equipment, combustion being initiated by means of a suitable ignition device. The engine is thus accelerated until it becomes self-driving, after which the supply of power from the external source may be discontinued.

The object of the present invention is to provide means for correctly correlating the fuel-supply, with the supply of external power used for starting.

It has been proposed, as for example in my British Patent No. 615,689 to utilise a fluid-pressure source for effecting starting rotation of the engine. In that patent I propose to direct a source of pressure-gas directly on to the blades of a turbine system; alternative methods of utilising fluid pressure may involve the use of a fluid-pressure motor, for example operated by pressure-gas derived from a cartridge or the equivalent.

The present invention is generally applicable to starting systems for gas-turbine-engines involving the use of a fluid-pressure supply source, and consists in the utilisation of such fluid-pressure or a pressure derived therefrom to actuate means for introducing fuel into the combustion equipment of the engine.

Accordingly, this invention provides a starter arrangement for a gas-turbine engine comprising in combination means providing a source of pressure-fluid, driving means actuated by the pressure-fluid to effect starting rotation and initial acceleration of the engine, and fuel-supply means for feeding fuel to the engine during starting and arranged to be operated by the pressure-fluid simultaneously with said driving means.

In a preferred arrangement, said fuel-supply means includes a fuel-containing cylinder, and a piston working in the cylinder and means to transmit the pressure of the pressure-fluid to the piston to displace it and thereby to discharge the fuel from the cylinder and deliver it to the engine. In this manner, fuel is injected into the combustion-equipment at the appropriate phase in the starting process.

There will now be described by way of example one arrangement whereby fuel is fed to the combustion equipment of a gas-turbine engine under control of a pressure fluid employed in starting the engine. The description refers to the accompanying diagrammatic drawing illustrating the arrangement.

Referring to the drawing, there is illustrated an aircraft jet-propulsion gas-turbine engine 1 of well-known construction comprising a compressor 2, a coaxial turbine 3 the rotor of which, as is usual, is connected to the compressor rotor to drive it, and a ring of combustion chambers 4 located between the compressor and turbine and around the interconnecting shaft. The compressor 2 draws in air through an inlet 5 and delivers it under pressure to the combustion chambers through delivery necks 2a. Fuel is delivered into the combustion chambers from a manifold 6 delivering through pipes 7 to injection devices 8 and the fuel is burnt in the air. The resulting hot gas is delivered to the turbine 3 and the exhaust gas leaves the engine through a jet-pipe 9.

During normal running of the engine, fuel is delivered to the manifold 6 by an engine-driven, fixed volumetric-capacity pump 10 past a throttle 11 through a pipe line 12. The pump draws the fuel from a tank 13 and a relief-valve-controlled by-pass 14 is provided between the tank and the delivery side of the pump 10 to return any excess of fuel back to the tank.

The starting mechanism comprises an auxiliary turbine 15 which can be connected through a driving connection 16 to the rotor assembly of the engine 1 to drive it during starting. The motive fluid for operating the auxiliary turbine 15 is derived from the discharge of a slow-burning cartridge 17, such as a cordite cartridge. The cartridge is housed in a discharger comprising a barrel 18 and a breech mechanism 19, and the gases generated by discharge of the cartridge are directed on to the blades 20 of the rotor of the auxiliary turbine by nozzles 21 fed from the barrel 18 through conduits 22. On discharge of the cartridge, therefore, the auxiliary turbine 15 is driven and the auxiliary turbine 15 in turn rotates and accelerates the rotor assembly of the gas-turbine engine 1 until it becomes self-driving.

It will be appreciated that, at the low engine speeds experienced during starting, the pump 10 will be unable to supply the fuel requirements of the engine 1. To overcome this difficulty the following arrangement is adopted.

An accumulator device 23 is connected at one end in the pipe-line 12 between the throttle 11 and the manifold 6, the device comprising a piston 24 working in a cylinder and a spring 25 urging the piston to the position in which the cylinder will be charged with fuel. The other end of the cylinder is connected by a conduit 26 to one end of the cylinder 27 of a second piston-and-cylinder device and the other end of the cylinder 27 is connected by a pipe 28 to one of the conduits 22. A spring 29 urges the piston 30 to the first-mentioned end of the cylinder 27 and the space between the pistons 30 and 24 is filled with a liquid. The spring 25 will be stronger than the spring 29.

A non-return valve 31 which allows fuel to pass from the pump 10 to the manifold 6, is included in the pipe 12 upstream of the accumulator device.

The accumulator device will, at starting, be charged with fuel as a result of the previous operation of the engine. On discharge of the cartridge 17, therefore, not only will the engine 1 be driven and accelerated but the fuel in the accumulator will be fed to the injection devices 8 due to the pressure of the gases in the conduit 22 acting on the piston 24 through the liquid in the pipe 12 and the piston 30.

In this way an adequate supply of fuel for starting will be ensured.

When the engine 1 is self-driving the normal fuel supply from the pump 10 is effective and the accumulator will again be charged with fuel.

I claim:

1. A gas-turbine engine comprising in combination a compressor; a turbine for driving the compressor; combustion equipment connected with the compressor delivery to receive compressed air therefrom and connected with the turbine to deliver heated gas thereto; a fuel supply system including fuel injection means through which liquid fuel is delivered to the combustion equipment during normal running; and starter means for the engine comprising a pressure fluid source, a pressure-fluid-actuated driving means connected with the pressure fluid source to be driven thereby, a driving connection from the pressure-fluid-actuated driving means to the compressor and turbine through which starting rotation and initial acceleration of the compressor and turbine is effected by said driving means, a pressure source of liquid fuel, an accumulator device comprising sealing means displaceable in and dividing a chamber of the accumulator device into two compartments, one of said compartments being connected with said pressure source of liquid fuel to receive fuel therefrom, a fuel delivery connection from said one compartment to the fuel injection means and a fluid-pressure-transmitting connection between the second of said compartments and said pressure fluid source through which fluid-pressure-transmitting connection pressure is applied to the sealing means to displace it in the chamber and to discharge fuel from said one compartment through the fuel delivery connection to the fuel injection means.

2. A gas-turbine engine comprising in combination a compressor; a turbine for driving the compressor; combustion equipment connected with the compressor delivery to receive compressed air therefrom and connected with the turbine to deliver heated gas thereto; a fuel supply system including a pressure source of liquid fuel and fuel injection means through which liquid fuel is delivered to the combustion equipment during normal running; and starter means for the engine comprising a pressure fluid source, pressure-fluid-actuated driving means connected with the pressure fluid source to be driven thereby, a driving connection from the pressure-fluid-actuated-driving means to the compressor and turbine through which starting rotation and initial acceleration of the compressor and turbine is effected by said driving means, an accumulator device comprising sealing means displaceable in and dividing a chamber of the accumulator device into two compartments, a fuel delivery line from said pressure source of liquid fuel to one of said compartments, a non-return valve in said fuel delivery line permitting flow of liquid fuel to the said one compartment, a fuel delivery connection from said one compartment to the fuel injection means, and a fluid-pressure-transmitting connection between the second of said compartments and said pressure fluid source through which fluid-pressure-transmitting connection pressure is applied to the sealing means to displace it in the chamber and to discharge fuel from said one compartment through the fuel delivery connection to the fuel injection means.

3. A gas-turbine engine comprising in combination a compressor; a turbine for driving the compressor; combustion equipment connected with the compressor delivery to receive compressed air therefrom and connected with the turbine to deliver heated gas thereto; a fuel supply system including a pressure source of liquid fuel and fuel injection means through which liquid fuel is delivered to the combustion equipment during normal running; and starter means for the engine comprising a pressure fluid source, pressure-fluid-actuated driving means connected with the pressure fluid source to be driven thereby, a driving connection from the pressure-fluid-actuated driving means to the compressor and turbine through which starting rotation and initial acceleration of the compressor and turbine is effected by said driving means, an accumulator device comprising a cylinder and a piston displaceable in the cylinder and dividing it into two compartments, a fuel delivery line from said pressure source of liquid fuel to one of said compartments, a non-return valve in said fuel delivery line permitting flow of liquid fuel to the said one compartment, a fuel delivery connection from said one compartment to the fuel injection means, and a fluid-pressure-transmitting connection between the second of said compartments and said pressure fluid source whereby pressure is applied to the piston to displace it in the chamber and to discharge fuel from said one compartment through the fuel delivery connection to the fuel injection means, said fluid-pressure-transmitting connection comprising a piston and cylinder device whereof the piston is displaceable in the cylinder and divides it into two spaces, conduit means connecting one of said spaces to the pressure fluid source, second conduit means connecting the second space with the second of said compartments, and a liquid filling for said second compartment, said second conduit means and said second space, and spring means loading the piston of the accumulator device in a direction tending to increase the volume of said one compartment.

4. A gas-turbine engine comprising in combination a compressor; a turbine for driving the compressor; combustion equipment connected with the compressor delivery to receive compressed air therefrom and connected with the turbine to deliver heated gas thereto; a fuel supply system including fuel injection means through which liquid fuel is delivered to the combustion equipment; and starter means for the engine comprising a device adapted to receive a cartridge for discharge and having a cartridge discharge gas outlet, a fluid motor connected with the outlet of said device to be driven by the cartridge discharge gases, a driving connection from the fluid motor to the compressor and turbine through which starting rotation and initial acceleration of the compressor and turbine is effected by said fluid motor, a pressure source of liquid fuel, an accumulator device comprising sealing means displaceable in and dividing a chamber of the accumulator device into two compartments, one of said compartments being connected with said pressure source of liquid fuel to receive fuel therefrom, a fuel delivery connection from said one compartment to the fuel injection means, and a fluid-pressure-transmitting connection between the second of said compartments and said outlet from the cartridge discharge device through which fluid-pressure-transmitting connection pressure is applied to the sealing means to displace it in the chamber and to discharge fuel from said one compartment through the fuel delivery connection to the fuel injection means.

5. A gas-turbine engine comprising in combination a compressor; a turbine for driving the compressor; combustion equipment connected with the compressor delivery to receive compressed air therefrom and connected with the turbine to deliver heated gas thereto; a fuel supply system including fuel injection means through which liquid fuel is delivered to the combustion equipment; and starter means for the engine comprising a device adapted to receive a cartridge for discharge and having a cartridge discharge gas outlet, an auxiliary turbine connected with the outlet of said device to be driven by the cartridge discharge gases, a driving connection from the auxiliary turbine to the compressor and turbine through which starting rotation and initial acceleration of the compressor and turbine is effected by said auxiliary turbine, a pressure source of liquid fuel, an accumulator device comprising sealing means displaceable in and dividing a chamber of the accumulator device into two compartments, one of said compartments being connected with said pressure source of liquid fuel to receive fuel therefrom, a fuel delivery connection from said one compartment to the fuel injection means, and a fluid-pressure-transmitting connection between the second of said compartments and said outlet from the cartridge discharge device through which fluid-pressure-transmitting connection pressure is applied to the sealing means to displace it in the chamber and to discharge fuel from said one compartment through the fuel delivery connection to the fuel injection means.

6. A gas-turbine engine comprising in combination a compressor; a turbine for driving the compressor; combustion equipment connected with the compressor delivery to receive compressed air therefrom and connected with the turbine to deliver heated gas thereto; a fuel supply system including a pressure source of liquid fuel and fuel injection means through which liquid fuel is delivered to the combustion equipment; and starter means for the engine comprising a device adapted to receive a cartridge for discharge and having a cartridge discharge gas outlet, a fluid motor connected with the outlet of said device to be driven by the cartridge discharge gases, a driving connection from the fluid motor to the compressor and turbine through which starting rotation and initial acceleration of the compressor and turbine is effected by said fluid motor, an accumulator device comprising sealing means displaceable in and dividing a chamber of the accumulator device into two compartments, a fuel delivery line from said pressure source of liquid fuel to one of said compartments, a non-return valve in said fuel delivery line permitting flow of liquid fuel to the said one compartment, a fuel delivery connection from said one compartment to the fuel injection means, and a fluid-pressure-transmitting connection between the second of said compartments and said outlet from the cartridge discharge device through which fluid-pressure-transmitting connection pressure is applied to the sealing means to displace it in the chamber and to discharge fuel from said one compartment through the fuel delivery connection to the fuel injection means.

7. A gas-turbine engine comprising in combination a compressor; a turbine for driving the compressor; combustion equipment connected with the compressor delivery to receive compressed air therefrom and connected with the turbine to deliver heated gas thereto; a fuel supply system including a pressure source of liquid fuel and fuel injection means through which liquid fuel is delivered to the combustion equipment; and starter means for the engine comprising a device adapted to receive a cartridge for discharge and having a cartridge discharge gas outlet, an auxiliary turbine connected with the outlet of said device to be driven by the cartridge discharge gases, a driving connection from the auxiliary turbine to the compressor and turbine through which starting rotation and initial acceleration of the compressor and turbine is effected by said auxiliary turbine, an accumulator device comprising sealing means displaceable in and dividing a chamber of the accumulator device into two compartments, a fuel delivery line from said pressure source of liquid fuel to one of said compartments, a non-return valve in said fuel delivery line permitting flow of liquid fuel to the said one compartment, a fuel delivery connection from said one compartment to the fuel injection means, and a fluid-pressure-transmitting connection between the second of said compartments and said outlet from the cartridge discharge device through which fluid-pressure-transmitting connection pressure is applied to the sealing means to displace it in the chamber and to discharge fuel from said one compartment through the fuel delivery connection to the fuel injection means.

8. A gas-turbine engine comprising a compressor, a turbine for driving the compressor, combustion equipment connected with the compressor delivery to receive compressed air therefrom and connected with the turbine to deliver heated gas thereto, a fuel supply system through which liquid fuel is delivered to the combustion equipment, starter and supplementary fuel feeding means comprising an accumulator having sealing means displaceable within and dividing the accumulator into two compartments, one of said compartments being positioned in the fuel supply system of the engine to receive fuel therefrom, fluid pressure means connected to the other compartment for applying pressure to the sealing means to displace it within the accumulator to discharge fuel from the said one compartment to the engine, a fluid motor having a driving connection with the engine, a discharger for receiving a gas discharging element, conduit means between said discharger and said fluid motor for conducting the discharged gases to the fluid motor, and conduit means between said discharger and said fluid pressure means for conducting the discharged gases against said fluid pressure means, whereby the fluid pressure means will apply pressure to said sealing means.

9. A gas-turbine engine comprising a compressor, a turbine for driving the compressor, combustion equipment connected with the compressor delivery to receive compressed air therefrom and connected with the turbine to deliver heated gas thereto, a fuel supply system through which liquid fuel is delivered to the combustion equipment, a starter and supplementary fuel feeding device comprising an accumulator device comprising a cylinder, a piston displaceable within the cylinder and dividing it into two compartments, one of said compartments being interposed in the fuel supply system of the engine for accumulating a supplementary supply of fuel at the end of the normal operation of the engine, fluid pressure means connected to the other compartment for applying pressure to said piston to displace it to discharge the supplementary supply of fuel to the engine, a fluid motor having a driving connection with the engine, a discharger, a gas discharging element within said discharger, conduit means between said discharger and said motor for conducting a portion of the gases from said element to said motor, and conduit means between said discharger and said fluid pressure means for conducting another portion of the gases against said fluid pressure means.

10. For use in a gas-turbine engine having a fuel supply system, starter and supplementary fuel feeding means cooperating with such engine and comprising an accumulator having sealing means displaceable within and dividing the accumulator into two compartments, one of said compartments adapted to be positioned in the fuel supply system of the engine to receive fuel therefrom, fluid pressure means connected to the other compartment for applying pressure to the sealing means to displace it within the accumulator to discharge fuel from the said one compartment to the engine, a fluid motor adapted to have a driving connection with the engine, a discharger for receiving a gas discharging element, conduit means between said discharger and said fluid motor for conducting the discharged gases to the fluid motor, and conduit means between said discharger and said fluid pressure means for conducting the discharged gases against said fluid pressure means, whereby the fluid pressure means will apply pressure to said sealing means.

11. A starter and supplementary fuel feeding device for an engine having a fuel supply system comprising an accumulator device comprising a cylinder, a piston displaceable within the cylinder and dividing it into two compartments, one of said compartments adapted to be interposed in the fuel supply system of the engine for accumulating a supplementary supply of fuel at the end of the normal operation of the engine, fluid pressure means connected to the other compartment for applying pressure to said piston to displace it to discharge the supplementary supply of fuel to the engine, a fluid motor adapted to have a driving connection with the engine, a discharger, a gas discharging element within said discharger, conduit means between said discharger and said motor for conducting a portion of the gases from said element to said motor, and conduit means between said discharger and said fluid pressure means for conducting another portion of the gases against said fluid pressure means.

DAVID HAVELOCK BALLANTYNE.

REFERENCES CITED

The following references are of record in the file of this patent:

UNITED STATES PATENTS

| Number | Name | Date |
|---|---|---|
| 997,003 | Pearson | July 4, 1911 |
| 1,055,550 | Meeder | Mar. 11, 1913 |
| 1,088,854 | Wadsworth | Mar. 3, 1914 |
| 2,046,074 | Heywood | June 30, 1936 |
| 2,056,710 | Caserta | Oct. 6, 1936 |
| 2,279,546 | Ziegler | Apr. 14, 1942 |
| 2,476,857 | Grafinger | July 19, 1949 |